April 17, 1962  C. W. WANDREY  3,030,462
SOLAR TIMING MECHANISM
Filed Dec. 11, 1958  3 Sheets-Sheet 1
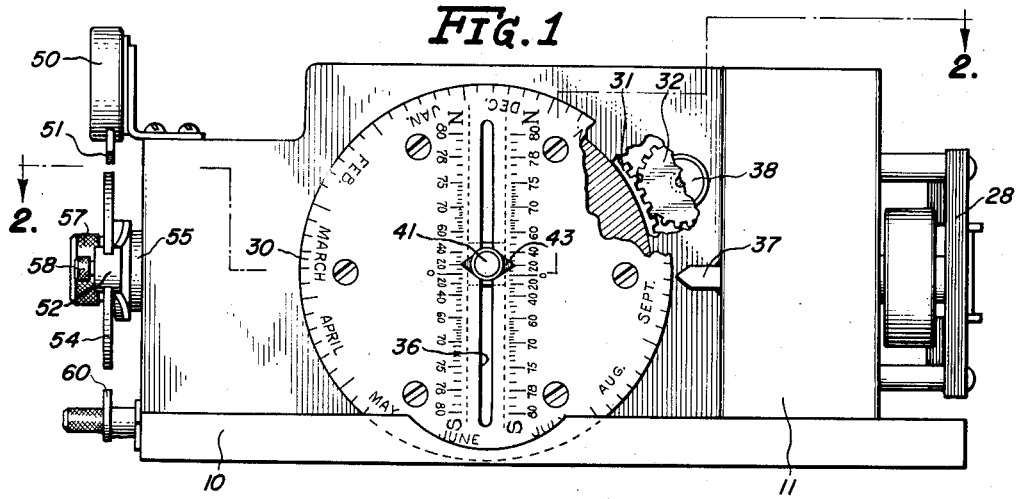
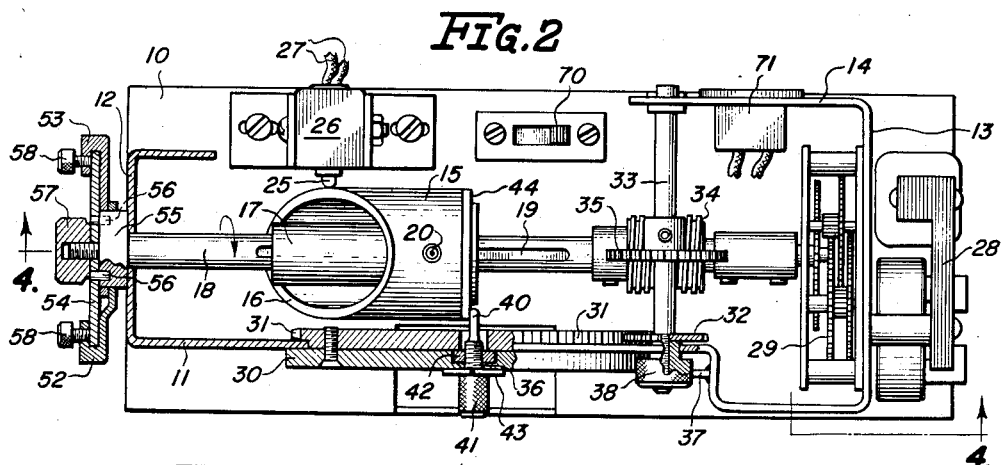
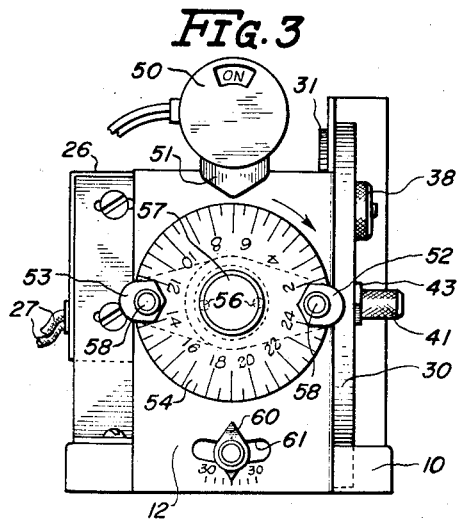
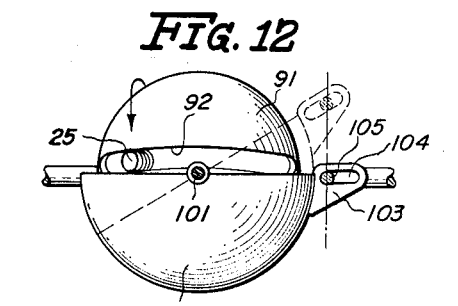
INVENTOR
Clarence W. Wandrey
BY Francis W. Crotty
ATTORNEY April 17, 1962     C. W. WANDREY     3,030,462
SOLAR TIMING MECHANISM
Filed Dec. 11, 1958     3 Sheets-Sheet 2
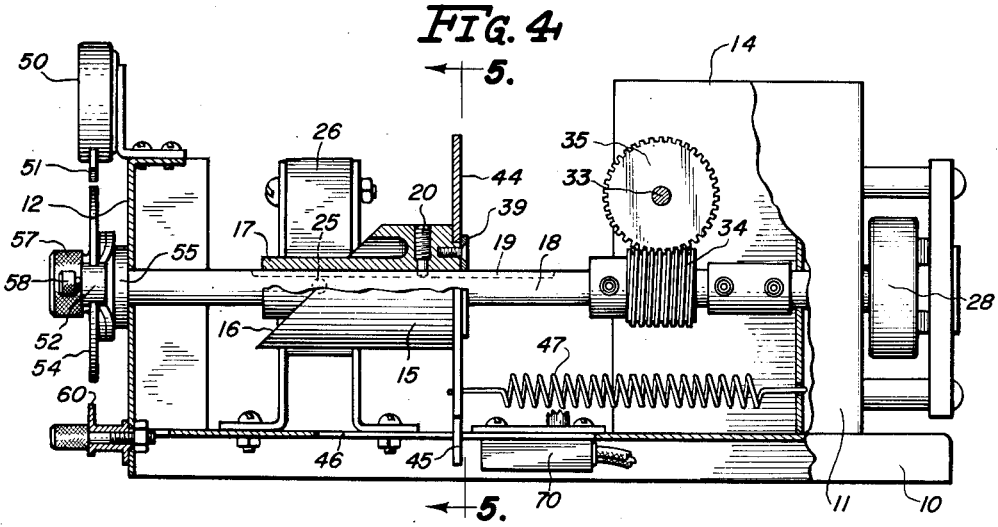
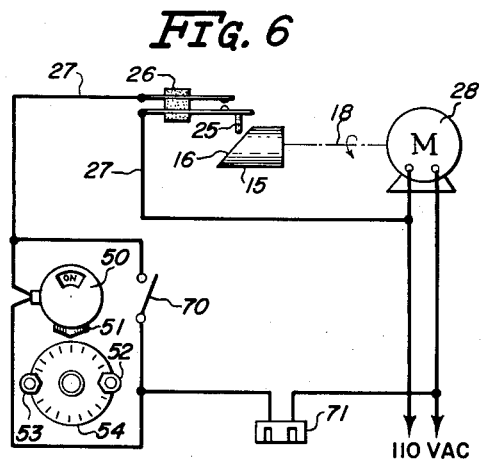
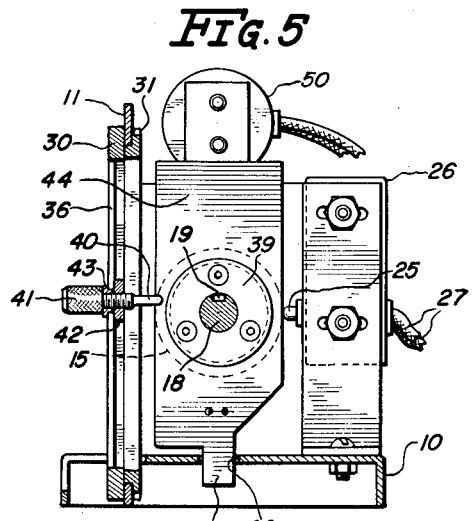
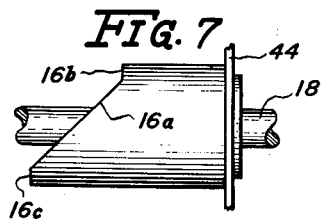
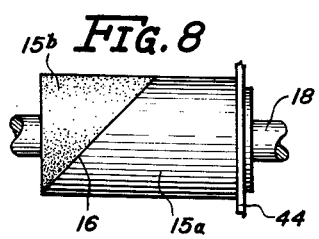
INVENTOR
Clarence W. Wandrey
BY Francis W. Crotty
ATTORNEY April 17, 1962 — C. W. WANDREY — 3,030,462
SOLAR TIMING MECHANISM
Filed Dec. 11, 1958 — 3 Sheets-Sheet 3

INVENTOR
Clarence W. Wandrey
BY Francis W. Crotty
ATTORNEY

United States Patent Office 3,030,462
Patented Apr. 17, 1962

3,030,462
SOLAR TIMING MECHANISM
Clarence W. Wandrey, Wheaton, Ill., assignor to Zenith Radio Corporation, a corporation of Delaware
Filed Dec. 11, 1958, Ser. No. 779,733
16 Claims. (Cl. 200—38)

The present invention is directed to a solar timing mechanism for actuating a controlled device diurnally. It is particularly useful in the many and varied applications where a device, such as a switch, is to be operated each day, being turned on at one time of the day and being turned off at a different time. Familiar installations employing this type of device are lighting and heating systems, burglar alarms, etc.

In any such system it is usually desirable that the system be placed in one condition at dusk and be changed to an alternate condition at dawn. For example, when employed to control street lighting, the street lamps are energized at dusk and are turned off at the approach of the next succeeding day.

It is, of course, recognized that the diurnal variations between daylight and dark are subject to two major variations. In the first place, they vary with position measured in degrees of latitude and also in accordance with the seasons or months of the year. With respect to changes in latitude, it will be appreciated that the variations cover a range of equal daylight and dark experienced at the equator to a condition of essentially complete daylight or darkness at the poles. The variations imposed by changes in the seasons reflect the fact that the axis of rotation of the earth varies from a perpendicular or normal relation relative to the plane of its orbit around the sun in a cycle that is compled in a year's time. Accordingly, both variations are to be taken into consideration in the construction of a mechanism for accomplishing what may be termed "solar timing."

Previous designs of such a mechanism have followed one of two quite different approaches. It is known, for example, to employ a photocell which produces a control effect varying in accordance with incident light. Obviously, such device is capable of distinguishing between daylight and dark and may be employed in systems of the general type in question. The control effect derivable from the photocell, however, requires amplification and these systems tend, therefore, to be more costly than desired. They are also affected by other light sources such as fires, searchlights, automobile headlights, lightning, etc.

The other prior approach employs one or more cams of unique contour patterned to approximate a desired timing function. The cam contour sometimes represents a compromise value for a particular position in degrees of latitude, compromising between diurnal variations of the longest and shortest days experienced in that location. This, of course, is but an approximation to the desired solution. Alternatively, the cam contours are carefully computed to more accurately represent the required timing function for the particular position. While this gives improved results, it is inflexible in use, being restricted to locations which share a common position in terms of latitude. It is very desirable that the apparatus have such flexibility that it may be transported from one location to another and be able to provide the necessary timing function wherever it may be located.

Accordingly, it is an object of the present invention to provide a solar timing mechanism which avoids the aforementioned limitations of prior devices.

It is a particular object of the invention to provide an improved solar timing mechanism characterized by the fact that it is readily and conveniently adjustable for precise operation wherever it may be situated.

It is a specific object of the invention to provide a solar timing mechanism of simplified construction and yet capable of representing diurnal variations modified to account for position in degrees latitude as well as changes in seasons of the year and location in time zone.

It is a further specific object of the invention to provide a solar timing mechanism having improved flexibility in use and adjustment.

A solar timing mechanism embodying the present invention and suitable for actuating a controlled device in accordance with diurnal variations comprises an actuator having a curvilinear surface with a boundary of such configuration that the arcuate lengths of incremental sections of that surface, taken in the axial direction thereof, vary in approximately the same manner as the length of night to day varies with degrees of latitude. A control element is positioned to engage the actuator circumferentially in the manner of a cam follower and in the region of its curvilinear surface for the purpose of operating the controlled device in accordance with a cycle of operations determined by the axial position of that element relative to that surface. Finally, there are means for effecting relative rotation of the actuator and control element at a predetermined rate.

The actuator, in accordance with one aspect of the invention, is a cam cylinder terminated at one end in an oblique planar section and is movable axially relative to the control element. The mean position of the cam cylinder in the axial direction is established in accordance with the latitude position of a particular location and the cylinder is rotated at a rate of once a day. The cylinder is concurrently reciprocated relative to the control element but at the rate of once a year to superimpose a change in the cycle of controlled operations representing the seasonal variations experienced at that position of latitude.

A further aspect of the invention contemplates the use of a hemispherical shell such that the control element is supported on a carriage located concentrically within that shell. Displacement of the control element along one diameter of the shell permits adjustment in accordance with the location measured in degrees of latitude. An oscillation of the shell about an axis normal to the direction of movement of the control element accommodates seasonal variations.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a front elevational view, partially broken away, of a solar timing mechanism constructed in accordance with one form of the invention;

FIGURE 2 is a sectional view taken as indicated by section line 2—2 of FIGURE 1;

FIGURE 3 is an elevational view looking toward the left end of the apparatus as depicted in FIGURE 1;

FIGURE 4 is a view taken as indicated by section line 4—4 in FIGURE 2;

FIGURE 5 is a view taken along section line 5—5 of FIGURE 4;

FIGURE 6 is a schematic wiring diagram for the apparatus of FIGURE 1;

FIGURES 7-8 represent modified forms of the cam cylinder embodied in the apparatus of FIGURE 1;

FIGURE 12 is a simplified plan view of the timing mechanism of FIGURE 9.

Figure 9:
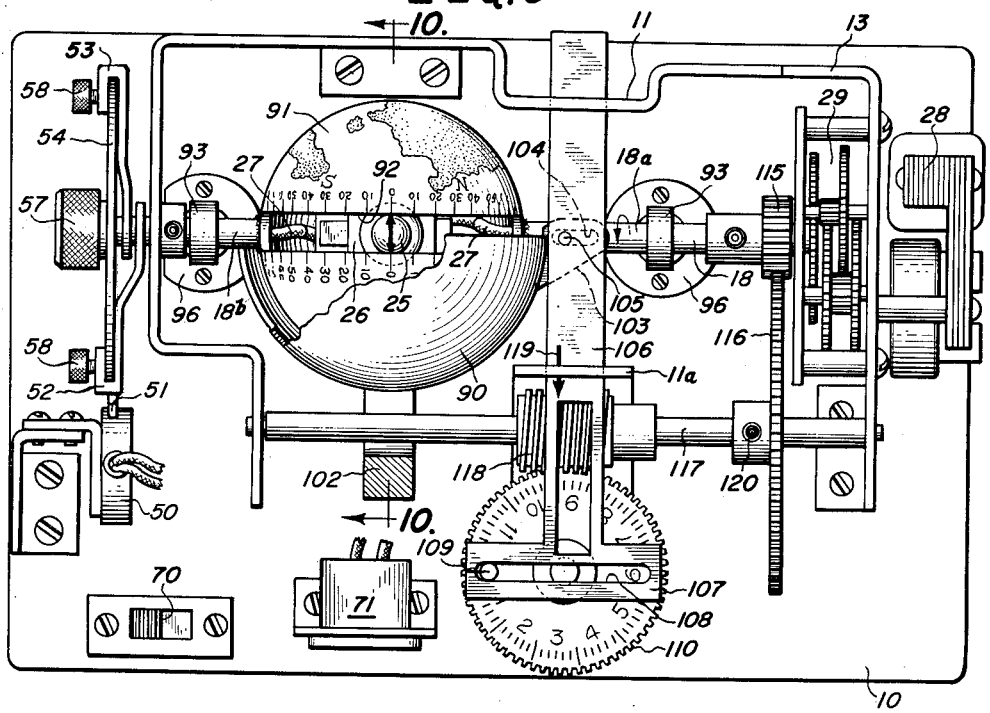
FIGURE 9 is a plan view of a modified form of solar timing mechanism embodying the subject invention.

Before considering the details of the apparatus embodiments of the invention, it is appropriate to examine more particularly into the nature of the variations in the ratio of day to night attributable to the geographical location of the point of observation and changes in the seasons of the year. It is apparent and certainly well known that this ratio varies with positions in latitude, approximately unity ratio being experienced at the equator as one extreme and, as the other extreme, a widely varying ratio being experienced at the poles where the 24 hours of a day may be entirely dark or light in certain seasons. For any particular point or location in terms of latitude, it is elementary that the variations of day to night result from the rotation of the earth about its axis. At the same time, the axis of the earth is not always perpendicular or normal to the plane of its orbit about the sun. The earth courses its orbit at a rate of once a year and in doing so shifts its angular position relative to normal over a range of plus and minus 23½ degrees. It may be shown that the ratio $\Gamma$ of night and day as a function of latitude $\alpha$ and of the angular relation of the earth's axis $\beta$ is as follows:

$$\Gamma = 2 \text{ arc. cos } (0.4348 \cdot \tan \alpha \times \cos \beta) \quad (1)$$

Each apparatus embodiment of the inventive concept features simple mechanical components and movements which give expression to the foregoing function to the end that, by means of simple adjustments, the latitude parameter ($\tan \alpha$) is established within the apparatus for the position in which it may be located. At the same time, the seasonal variations of the position of the earth's axis relative to its orbit about the sun (the $\cos \beta$ parameter) are likewise registered in the device to cooperate with the latitude information and arrive at an accurate timing function for the geographical position of the instrument.

Referring now more particularly to the timing mechanism illustrated in FIGURES 1 to 5, inclusive, it has a supporting base 10 upon which is secured a wall structure comprising a front panel 11 with returned sections constituting end panels 12 and 13. A further returned section 14 of end plate 13 serves as a back panel. All of the components of the instrument are mounted upon base 10 and the several panels constituting the upstanding wall.

One principal component is an actuator having an active curvilinear surface with a boundary of such configuration that the arcuate lengths of incremental sections of that surface, taken in the axial direction thereof, vary in approximately the same manner as the length of night to day varies with degrees of position in terms of latitude. More particularly, this actuator for the embodiment under consideration is a cam cylinder 15 terminating at one end in a surface 16 formed by an oblique planar sectioning of the cylinder. The angle $\theta$ which the inclined face of surface 16 defines with the horizontal is determined in a manner to be made clear hereinafter. It is convenient to construct the cam cylinder with an elongated, centrally disposed hub 17 for contributing mechanical rigidity and also for mounting the cylinder upon a supporting shaft 18. The shaft is provided with a keyway 19, and a key in the form of a machine screw 20 having a reduced diameter section at one end projects through the cam cylinder into the keyway. The key and slot provision secures the cam cylinder for rotation with shaft 18 and at the same time permits longitudinal displacement of the cam cylinder along the shaft throughout the length of the keyway.

A control element cooperates with the actuator or cam cylinder 15, being positioned to engage the cylinder circumferentially in the manner of a cam follower and in the region of its surface 16 for operating a controlled device, such as a switch, in accordance with a cycle of operations determined by the axial position of the control element relative to the cam surface. Where the timing mechanism is to control a switch, the control element under consideration may take the form of a switch operator 25 projecting from a switch assembly 26 of any conventional construction. It is most convenient to employ a switch having an operating plunger which, when depressed, establishes the switch in its closed condition and when released opens the switch or vice versa. Since the structural details of such a mechanism are well understood in the art, they have not been shown in the drawings other than for the casing, plunger 25 and the leads 27, 27 for connecting the switch into a controlled circuit.

The switch assembly is supported on base 10 in position to be engaged and actuated by cam cylinder 15. As shown in FIGURE 2, the spatial relation of plunger 25 to cam cylinder 15 is such that as the cam cylinder is rotated about its longitudinal axis, an arc or sector of the cam cylinder is presented to plunger 25 to depress or actuate the plunger and then release it once in each cycle of rotation. Since only an arcuate sector of the cam engages and depresses the plunger in each rotation of the cylinder, the plunger is freed or released throughout the remaining angular travel of each revolution. Obviously, the portion of each revolution of the cam cylinder during which the cam depresses the switch plunger is directly dependent upon the relative axial position of the plunger and cam surface 16. The means for effecting relative rotation of actuator 15 and control element 25 includes a motor 28 which is coupled to shaft 18 through a speed reduction gear assembly 29 to the end that shaft 18 rotates at a predetermined rate, specifically, at a rate of once every 24 hours. Since the ratio of daylight to dark varies seasonally, as explained herein above, it is necessary to effect not only relative rotation of cam cylinder 15 and plunger 25, but also relative axial displacement of these elements at a rate that is low with respect to the speed of rotation of the cam cylinder. This is accomplished through a mechanical drive of the arm and crank type.

This drive includes a dial plate 30 rotatably supported in a cut-away section of front panel 11 of the instrument. Rotation of this plate is achieved by means of a gear 31 to which the plate is affixed and a companion gear 32 carried on a cross shaft 33. One end of this shaft has a reduced diameter and threaded section projecting through front wall 11. Gear 32 mounts on the reduced diameter section and is releasably locked to the shaft by means of a thumb nut 38. Cross shaft 33 is driven from shaft 18 through a worm gear 34 secured to that shaft and a companion gear 35 carried by shaft 33. The gear drive effecting rotation of plate 30, concurrently with shaft 18, is so chosen that the speed of revolution of plate 30 is indeed very low relative to that of shaft 18. In particular, plate 30 is driven at the rate of one revolution per calendar year.

Disc 30 has a slot 36 extending centrally thereof and a calibrated scale is inscribed therealong. This is a tangent scale calibrated in accordance with the tangent of angles of degrees latitude, both North and South, with the zero degree location at the center of rotation. Additionally, plate 30 has a calendar scale inscribed about its outer periphery and a stationary index 37 permits reading this scale.

Rotary motion of dial plate 30 is translated into axial displacement of cam cylinder 15 by means of a crank connected at one end to the cylinder and adjustably fixed at its opposite end for displacement along scale 36 of dial plate 30. This crank is shown as a machine screw 40 having a reduced diameter at one end and a knurled enlargement 41 at the other. Screw 40 threads through a lock nut 42 which spans slot 36 on the side thereof opposite knurled portion 41. It is convenient to form a channel way in plate 30 in which the lock nut may slide as indicated in FIGURE 2. Interposed between knurled terminal 41 and dial plate 30 is an index 43 to facilitate adjustment of the crank in relation to the tangent scale inscribed beside slot 36.

The free end of element 40 extends beyond the projected dimension of cam cylinder 15 to permit engagement with a plate 44 secured to one end of cam cylinder 15 and disposed vertically. Plate 44 has an aperture through which a reduced diameter end section of cam cylinder 15 extends. An end plate 39 is fastened by machine screws to cylinder 15. It is a disc which has an outer diameter exceeding the diameter of the aperture in plate 44 to retain the assembly of this plate with cam cylinder 15 while, at the same time, permitting the cylinder to rotate freely. Plate 44 is restrained against rotation by means of a tongue-like extension 45 received within a channel way 46 formed in support base 10 as indicated in FIGURE 4. Of course, slot 46 has about the same length as keyway 19 of shaft 18 so that the cam cylinder may reciprocate as described above. Element 40 is maintained in effective mechanical engagement with cylinder 15 by means of a spring 47 anchored at one end to plate 44 and at its other end to the casing of gear box 29 or, if desired, to end panel 13 of the wall structure. This spring urges cam 15 against pin 41 and, in effect, maintains a mechanical connection therebetween.

It is desirable in certain installations to have a second control switch connected in series with switch 26 in the controlled circuit so that the operation of the controlled device may be restricted to particular portions of the night or day cycle as distinguished from the entire part of the 24 hours which may be devoted to either night or day. For this purpose the instrument may include a second switch 50 having an operating plunger 51 such that successive actuations of the plunger in push button fashion cause the switch to open and close alternately. This switch is supported from end panel 12 of the wall structure with its plunger 51 disposed in the path of travel of a pair of switch actuators 52, 53. The means for moving these switch actuators to effect displacement of switch plunger 51 comprises another dial plate 54 secured to an extension of shaft 18 for rotation therewith. This shaft is journaled in end panel 12 and projects therebeyond in order to accommodate plate 54. A hub 55 is secured to the free end of shaft 18 and has a pair of diametrically opposed recesses which may receive locating pins 56, 56 projecting from one face of plate 54. A thumb nut 57 locks plate 54 to hub 55. This hub also serves as a journal which supports switch operators 52, 53. Each of these operators has an aperture at one end permitting it to be slipped over the journal before plate 54 is secured in position. The opposite end of each operator is J-shaped and carries a locking screw 58 through which each operator may be locked in a selected position relative to a 24 hour clock scale inscribed on plate 54.

The time scale of plate 54 may be read by means of an index 60 adjustably fixed within an arcuate slot 61 of end panel 12. A further calibration, constituting a zero center scale representing a time interval of one hour, is inscribed adjacent slot 61. The purpose of this scale is to orient cylinder 15 precisely in accordance with the location of the instrument within a time zone. The desirability of this adjustment is apparent when it is recognized that the times of sunrise and sunset, as generally given, apply through a complete time zone whereas they, in fact, apply accurately only to the center of the zone. If one should be located midway between the midpoints of two time zones, the time for his location is to be advanced or delayed 30 minutes and this correction is facilitated by the adjustment of indicator 60.

In describing the operation of this timing mechanism, consideration will first be given to adjusting the instrument for a particular location and it will be assumed that the location is 20 degrees North latitude. Thumb nut 41 is released and element 40 is moved until indicator 43 registers with the 20 degree North mark of the tangent scale adjacent slot 36 as indicated illustratively in FIGURE 1. The thumb nut is then tightened to retain element 40 in its selected position. Thumb nut 38 is released to permit free rotation of gears 31 and 32. While these gears are free to turn, dial plate 30 is rotated to register the correct calendar date with indicator 37 and nut 38 is tightened. The apparatus has now been adjusted in terms of latitude position and the calendar cycle and it is necessary to set the device timewise, that is to say, to the appropriate point within the diurnal cycle.

If it is assumed that the adjustment is being made at noon, dial 54 is manually rotated to register noon with indicator 60, assuming of course that motor 28 is de-energized. As shown in FIGURE 3, indicator 60 is at the zero position of its scale if the instrument is located in the middle of the time zone. If it is not at the center of the time zone but West thereof, indicator 60 is displaced to the right of zero position by a corresponding mount. For example, for a location at the extreme Western edge of the time zone it is necessary to shift indicator 60 to the right to register with the 30 calibration mark. Conversely, locations at the extreme Eastern edge of the zone require displacement of indicator 60 to the 30′ calibration mark left of center and intermediate locations necessitate positioning indicator 60 between these extremes. Having appropriately set indicator 60, dial 54 is made accurately to register the time of day.

It will be assumed initially that it is only desirable to utilize the control function of switch 26 and to omit the function of switch 50. This is accomplished by a switch 70 secured on the standard 10 of the instrument and connected in shunt with switch 50 as shown in the schematic diagram of FIGURE 6. When closed, it shunts out switch 50 and leaves the control of the circuit entirely to switch 26. The controlled device, whatever it may be, may be plugged into a receptacle or outlet 71 mounted in end panel 14 to be energized only during operating intervals during which switch 26 is closed. Having thus conditioned the apparatus, motor 28 is energized to rotate shaft 18 and cam cylinder 15 at a rate of once every 24 hours. The adjustment of pin 40 within slot 36 and the rotation of dial plate 30 to conform to the particular season of the year, selectively establish a plane of contact of switch plunger 25 relative to cam surface 16 corresponding to the selected position in degrees latitude. If one ignores for the time being the seasonal fluctuations of the ratio of night to day, it will be seen that plunger 25 engages cam surface 16 and is depressed thereby and retained in this condition for the portion of the day in which its engagement with the cam surface continues. As soon as the plunger rides off the cam surface, switch 26 is opened or established in its alternative operating condition. Thus, the apparatus plugged into receptacle 71 functions in accordance with a cycle of operations determined by the relative axial position of cam surface 16 and plunger 25. It is energized when the switch plunger engages the cam cylinder and is de-energized when the switch plunger is freed of the cam cylinder or vice versa, depending upon the desired operation.

Because of the rotation of dial plate 30 and the translation of its rotary motion into axial displacement of cam 30 through pin 40 the cam cylinder shifts axially at the same time it rotates with shaft 18. The period of its axial displacement, however, is at a rate of once a year. The effect of this axial displacement is to change the period of any 24 hours in which switch plunger 25 is engaged and operated by the cam cylinder. It is apparent from observation of FIGURE 2 that plunger 25 at any axial position relative to the cam cylinder is actuated for a period of time corresponding to the sector of the cam which is located within a transverse plane including the plunger. As the cam cylinder shifts axially, the length of that sector shortens or lengthens depending upon whether movement is to the right or to the left of the position of switch plunger 25.

Referring to Equation 1 set forth hereinabove, it is evident that the ratio Γ is determined in accordance with the tangent of the latitude and also in accordance with the cosine function of the angular disposition of the earth's axis. The tangent parameter is established in the apparatus by the selective positioning of pin 40 along the tangent scale inscribed adjacent slot 36 of dial plate 30. The effective crank function of pin 40 produces a horizontal motion contributing the cosine function properly oriented with respect to the calendar year by the angular adjustment of dial plate 30 relative to index 37. The angle θ of cam surface 16 is correlated to the displacement of pin 40 properly to utilize the tangent and cosine parameters in the determination of Γ. This results through determination of the value of θ in accordance with the following expression:

$$\tan \theta = \frac{D}{d} \qquad (2)$$

where capital D is the external diameter of cam cylinder 15 and $d$ is the travel of pin 40 for a latitude of 66.5°. This travel is the measured horizontal displacement of the pin and thus also the axial displacement of cam cylinder 15 for this latitude setting between the calendar dates of June 21 and December 21.

With mounting pins 56 of dial plate 54 received in hub 55 in one of the two possible ways of associating the pins with the hub, pin 25 engages cam surface 16 during daylight hours. If thumb nut 57 is removed and the dial plate mounted with its pins 56 in their alternate relation and thumb nut 57 returned, switch 26 is actuated during the night time hours. Accordingly, it is convenient with the described mechanism to operate switch 25 at the start of dusk or at the start of daylight as one chooses.

In some installations it is advantageous to further refine the control of the apparatus energized through receptacle 71 and additional refinement is achieved by opening switch 70 to place switch 50 in series with switch 26. If the apparatus is conditioned to cause cam cylinder 15 to close switch contacts 26 at dusk, switch 50 may defer completing the circuit through receptacle 71 to a preselected one of the evening hours. For example, one of operators 52, 53 may be adjusted with respect to dial plate 54 to pass under switch plunger 51 at 7 o'clock in the evening. Assuming switch 50 to have previously been opened, the circuit in which it is included is conditioned upon the closure of switch 26 by cam 15 at dusk and this circuit is completed at the selected evening hour by the subsequent actuation of switch plunger 51 by operator 52 or 53. The circuit may, if desired, be de-energized within the interval in which switch contacts 26 remain closed by cylinder 15 if the other of switch operators 52, 53 is adjusted to actuate switch plunger 51 prior to the instant when cam 15 otherwise opens switch 26. In similar fashion, switch operators 52, 53 may be utilized to achieve refined control of the device energized from receptacle 71 at selected parts of the day as distinguished from the night.

It is convenient to form cam surface 16 of cylinder 15 by means of an oblique planar sectioning or slice but, of course, it is not always necessary that the cam surface be a continuous plane extending transversely of the entire width of cylinder 15. In FIGURE 7, for example, the surface 16a of cam cylinder 15 is a portion of an oblique planar section and terminates in abrupt discontinuities 16b, 16c. This cam arrangement may be employed in applications wherein it is not necessary to accommodate the entire latitude range.

Nor is it necessary that component 15 be a cam in the strict mechanical sense of the term. An equivalent arrangement is represented in FIGURE 8 where the cylinder is formed of two sections 15a, 15b. The first section is constructed of conductive material and the latter is non-conductive. A simple method of preparing the non-conductive section contemplates coating this section with a suitable non-conductive layer. In this instance, the meeting plane 16 between the two sections of the cylinder is the counterpart of surface 16 of the embodiment of FIGURE 1. It presents the same type of surface boundary configuration to the cam follower as the cylinder described in connection with that figure.

A further modification of the invention is disclosed in FIGURES 9 through 12. It differs primarily from the first described embodiment in the manner in which variations in ratio Γ of night and day are simulated. More specifically, the actuator of FIGURE 9 is a hemispheric shell 90 the inner surface of which presents a boundary of such configuration that arcuate lengths of incremental sections of that surface taken in an axial direction thereof, vary in approximately the same manner as the length of night to day varies with degrees of latitude. The control element in this case is accommodated by a curvilinear support 91 which is shown as a sphere. This sphere is mounted in concentric relation with shell 90 and they have a common horizontal axis. The sphere is slotted along this axis as indicated at 92 and an angular scale is inscribed adjacent the slot. This is a zero position scale with the zero degree calibration at the vertcal center. Scale markings on either side of the zero represent degrees of latitude both North and South. Sphere 91 is hollow and supports the control element which, again, may be the plunger 25 of a switch 26.

The leads 27 of this switch extend through the shaft which rotatably supports the sphere. This shaft has one section 18a mechanically connected at one end with drive shaft 18 and, at its other end, is integrated with sphere 91. The other shaft segment 18b connects at one end to the diametrically opposite part of sphere 91 and, at its other end, is journaled within panel 12 and extends therebeyond to receive dial plate 54. Each shaft segment supports a commutator ring 93 insulated from the shaft by means of a bushing 94, and each shaft segment is hollow so that a respective one of leads 27 from switch 26 may extend from sphere 91 through that shaft segment and out of an aperture in that respective shaft segment for conductive connection with commutator ring 93. A brush 95 supported within a vertical standard 96 extends the circuit of each lead to output conductors 27a, 27a while, at the same time, affording the necessary insulation of the switch circuit from the instrument.

The control element and its switch 26 are mounted within sphere 91 with the switch plunger extending through slot 92 of the sphere in order to permit its engagement with hemisphere 90. Also, in order to introduce the compensation required because of latitude position, the switch plunger is supported in adjustably fixed position with respect to the angular scale. For this purpose, the switch assembly is mechanically carried by stub shafts 97 journaled within bearings 98 formed on the inner periphery of sphere 91. These bearings are diametrically opposed from one another and lie in a plane normal to the axis of shaft 18.

The compensation required because of variations of the disposition of the earth's axis in respect of its orbit about the sun is accomplished by supporting hemisphere 90 for oscillation about its vertical axis in an amount of plus and minus 23½° corresponding to the angular deviation of the earth's axis in the course of a year. Accordingly, the supports 100 and 101 for the hemisphere are disposed along the vertical axis thereof. Support 100 is journaled within base 10 of the instrument and support 101 is journaled within a support bracket 102 carried by the base. An extension 103 projecting horizontally from one edge of the hemisphere has a slot 104 for receiving a pin 105 depending from a reciprocating member 106. This member is T-shaped and its longer section is slidably received within aligned apertures in walls 11 and 11a. The opposite end portion 107 of this member has a slot 108 which is disposed in parallel relation to drive shaft 18. Another pin 109 projecting vertically upwardly from the face of a gear 110 couples member 106 thereto. One face of gear 110 is calibrated into a calendar scale in the manner of dial plate 30 of the first described embodiment of the invention. The dimensions of the T-shaped member and gear 110 are such that the excursion of the hemisphere from its means or zero position represented in FIGURE 9 to its extremes in either direction therefrom is 23½ degrees. One such extreme position is represented in broken construction lines in FIGURE 12.

Motor 28 rotates sphere 91 through reduction gear assembly 29 and shaft 18 at a rate of once per 24 hours. Concurrent oscillation of hemisphere 90 at a rate of one cycle per year is achieved through mating gears 115, 116 which drive a shaft 117 rotatably supported from wall structure 11 and carrying a worm gear 118 which is in meshing engagement with gear 110. The connection of gear 116 to shaft 117 may be released by manipulating a set screw 120, which may for convenience be a thumb nut, extending through the bushing of the gear into engagement with the shaft. This facilitates adjustment of this apparatus when that is required.

In order to employ this instrument, the position in degrees latitude is registered by moving control element or switch plunger 25 to the appropriate angular position on the scale inscribed in hemisphere 91. The calendar date is registered by releasing set screw 120 to permit free rotation of shaft 117 and gear 110. This gear is rotated so that the date is recorded relative to the index 119 on member 106. Thereafter, the driving system is completed again by driving set screw 120 home. It is now only necessary to record the hour of the day and this is accomplished by rotating dial 54 in the manner described in connection with the arrangement of FIGURE 1. Motor 28 may now be energized and a controlled device plugged into receptacle 71 is subject to the same type of cyclic operations, determined by the axial position of switch plunger 25 relative to hemisphere 90, as aforedescribed in connection with the operation of the embodiment of FIGURE 1.

Figure 10:
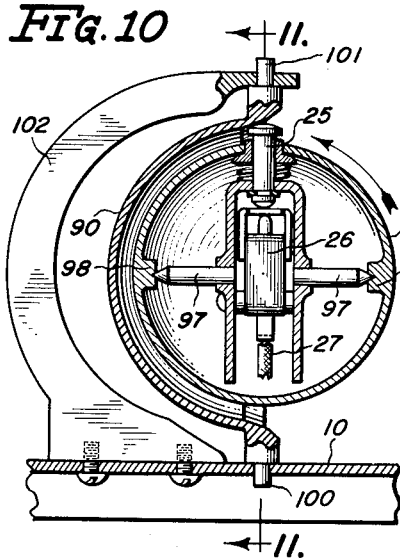
FIGURE 10 is a sectional view taken as indicated by section line 10—10 in FIGURE 9.
Figure 11:
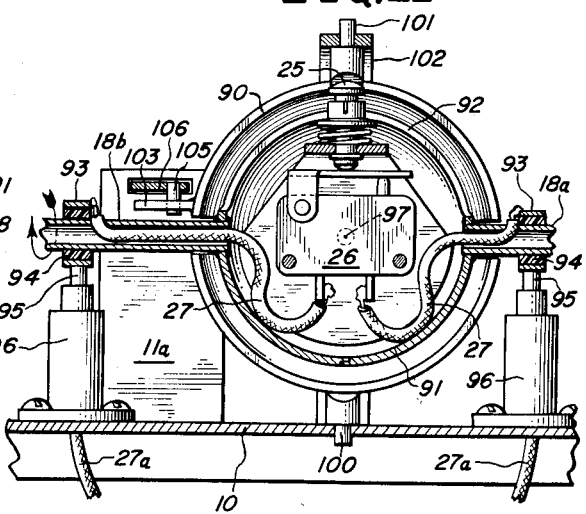
FIGURE 11 is a further sectional view taken as indicated by section line 11—11 in FIGURE 10.

In brief, as sphere 91 rotates, control element 25 enters into the region of hemisphere 90 as is represented in FIGURE 10. At that instant, the hemisphere actuates or depresses the plunger that operates switch 26. The switch remains operated until the plunger passes beyond the sphere of actuator 90 at which time the switch assumes its alternate operating condition. The mean ratio of night to day is experienced with hemisphere 90 in the position shown in FIGURE 9 and it is properly correlated to latitude grade by the selective position of plunger 25 relative to the angle scale inscribed beside slot 92 of sphere 91. The variations in this mean, representing seasonal changes in the diurnal cycle, are contributed by the oscillation of hemisphere 90 under the control of gear 110 and crank 106.

The switch may be closed during the daylight hours under the influence of hemisphere 90 or, alternatively, it may be opened during the daylight hours and closed during hours of the night. This arrangement also provides the more refined control possible with the supplementary switch 50.

It is apparent that in each embodiment of the invention, the ratio Γ of day to night is determined in accordance with the latitude registered within the device and is further determined in accordance with seasonal fluctuations of the angular disposition of the earth's axis with respect to its orbit about the sun. The mechanism is extremely flexible and may accommodate all latitudes or positions both North and South. It only requires the making of a very simple adjustment to register the latitude and once the latitude has been registered the seasonal variations are automatically imposed.

While there have been described particular embodiments of the invention, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a predetermined rate.

2. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a rate of one revolution each twenty-four hours.

3. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a predetermined rate; and means for effecting relative axial displacement of said actuator and said element at a rate low with respect to said predetermined rate.

4. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a rate of one revolution each twenty-four hours; and means for effecting relative axial and cyclical displacement of said actuator and said element at a rate of one cycle per calendar year.

5. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; means for selectively establishing the plane of contact of said element relative to said surface to correspond to a position of a predetermined number of degrees latitude; and means for effecting relative rotation of said actuator and said element at a predetermined rate.

6. A solar timing mechanism for actuating a controlled device comprising: an actuator including a cam cylinder terminating in a surface formed by at least a portion of an oblique planar sectioning of said cylinder such that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a predetermined rate.

7. A solar timing mechanism for actuating a controlled device comprising: an actuator including a cylinder having one end terminated in an oblique planar section to constitute a cam surface such that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a predetermined rate.

8. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a rate of one revolution each twenty-four hours; and means for concurrently effecting relative axial and cyclical displacement of said actuator and said element at a rate of one cycle per calendar year.

9. A solar timing mechanism for actuating a controlled device comprising: an actuator including a rotatable cam cylinder terminating in a surface formed by at least a portion of an oblique planar sectioning of said cylinder such that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for rotating said cam cylinder at a given rate and for concurrently reciprocating said cam cylinder in an axial direction at a rate slow with respect to said given rate.

10. A solar timing mechanism for actuating a controlled device comprising: an actuator including a rotatable cam cylinder terminating in a surface formed by at least a portion of an oblique planar sectioning of said cylinder such that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; means for rotating said cam cylinder at a given rate; a plate rotatable at a rate slow relative to said given rate and having a diametrically disposed scale calibrated in accordance with the tangent of the angle representing a range of degrees of latitude with zero degrees at the center of rotation; a crank connected at one end to said cylinder to effect axial displacement thereof and adjustably affixed at its opposite end for selective displacement along said scale; and means for rotating said plate concurrently with said cam cylinder.

11. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; means for effecting relative rotation of said actuator and said element at a predetermined rate; and means for effecting relative axial displacement of said actuator and said element at a rate low with respect to said predetermined rate and in accordance with the angular variations of the axis of the earth's rotation relative to a plane perpendicular to the earth's orbit around the sun.

12. A solar timing mechanism for actuating a controlled device comprising: an actuator having an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; means for selectively establishing the plane of contact of said element relative to said surface to correspond to a position of a predetermined number of degrees latitude; and means for effecting relative rotation of said actuator and said element at a predetermined rate and for concurrently effecting relative axial displacement of said actuator and said element at a rate low with respect to said predetermined rate and in accordance with the angular variations of the axis of the earth's rotation relative to a plane perpendicular to the earth's orbit around the sun.

13. A solar timing mechanism for actuating a controlled device comprising: an actuator comprising a hemispherical shell presenting an active curvilinear surface with a boundary of such configuration that the arcuate lengths of incremental sections of such surface, taken in the axial direction thereof, vary in approximately the same manner as the length of night to day varies with degrees of latitude; a control element positioned to engage said actuator circumferentially in the manner of a cam follower and in the region of said surface for operating said controlled device in accordance with a cycle of operations determined by the axial position of said element relative to said surface; and means for effecting relative rotation of said actuator and said element at a predetermined rate.

14. A solar timing mechanism for actuating a controlled device comprising: an actuator comprising a hemispherical shell presenting an active curvilinear surface with a boundary of such configuration that the arcuate lengths of incremental sections of such surface, taken in the axial direction thereof, vary in approximately the same manner as the length of night to day varies with degrees of latitude; a curvilinear support mounted on one axis of said shell in concentric relation therewith and having an angle scale calibrated thereon with zero degrees located centrally thereof in the plane of another axis of said shell normal to said one axis; a control element mounted with said support in an adjustably fixed position along said scale to engage said actuator circumferentially in the manner of a cam follower and in the region of said surface for operating said controlled device in accordance with a cycle of operations determined by the axial position of said element relative to said surface; and means for effecting relative rotation of said actuator and said element about said one axis at a predetermined rate.

15. A solar timing mechanism for actuating a controlled device comprising: an actuator comprising a hemispherical shell supported for oscillation about a first axis and presenting an active curvilinear surface with a boundary of such configuration that the arcuate lengths of incremental sections of such surface, taken in the axial direction thereof, vary in approximately the same manner as the length of night to day varies with degrees of latitude; a curvilinear support mounted on a second axis of said shell normal to said first axis and in concentric relation therewith and having an angle scale calibrated thereon with zero degrees located centrally thereof in the plane of said one axis; a control element mounted with said support in an adjustably fixed position along said scale to engage said actuator circumferentially in the manner of a cam follower and in the region of said surface for operating said controlled device in accordance with a cycle of operations determined by the axial position of said element relative to said surface; means for effecting relative rotation of said actuator and said element about said second axis at a predetermined rate and for concurrently oscillating said shell at a rate low with respect to said predetermined rate.

16. A solar timing mechanism for actuating a controlled device comprising: an actuator comprising a hemispherical shell supported for oscillation about a first axis and presenting an active curvilinear surface with a boundary of such configuration that the arcuate lengths of incremental sections of such surface, taken in the axial direction thereof, vary in approximately the same manner as the length of night to day varies with degrees of latitude; a curvilinear support mounted on a second axis of said shell normal to said first axis and in concentric relation therewith and having an angle scale calibrated thereon with zero degrees located centrally thereof in the plane of said one axis; a control element mounted with said support in an adjustably fixed position along said scale to engage said actuator circumferentially in the manner of a cam follower and in the region of said surface for operating said controlled device in accordance with a cycle of operations determined by the axial position of said element relative to said surface; means for effecting relative rotation of said actuator and said element about said second axis at a rate of once a day and for concurrently oscillating said shell at a rate of once a year.

References Cited in the file of this patent
UNITED STATES PATENTS

| 1,158,397 | Warren | Oct. 26, 1915 |
| 2,545,719 | Wedeberg | Mar. 20, 1951 |
| 2,823,285 | Stone | Feb. 11, 1958 |